(12) United States Patent
Oh (10) Patent No.: US 11,059,476 B2
(45) Date of Patent: Jul. 13, 2021

(54) METHOD OF CONTROLLING GEAR SHIFT IN NEUTRAL GEAR STAGE IN HYBRID ELECTRIC VEHICLE

(71) Applicants: Hyundai Motor Company, Seoul (KR); Kia Motors Corporation, Seoul (KR)

(72) Inventor: Jong-Bum Oh, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/836,392

(22) Filed: Mar. 31, 2020

(65) Prior Publication Data

US 2021/0086750 A1 Mar. 25, 2021

(30) Foreign Application Priority Data

Sep. 19, 2019 (KR) .......................... 10-2019-0115232

(51) Int. Cl.
*B60W 30/19* (2012.01)
*B60W 20/30* (2016.01)
(Continued)

(52) U.S. Cl.
CPC ............ *B60W 20/30* (2013.01); *B60W 10/08* (2013.01); *B60W 10/10* (2013.01); *B60W 30/19* (2013.01);
(Continued)

(58) Field of Classification Search
CPC ....... Y10T 477/23; F16H 59/42; F16H 59/40; F16H 59/70; F16H 2059/708;
(Continued)

(56) References Cited

U.S. PATENT DOCUMENTS 5,884,201 A * 3/1999 Kawai ...................... B60K 1/00
701/22
2007/0289400 A1* 12/2007 Mitchell ................. F16H 63/50
74/335
(Continued)

FOREIGN PATENT DOCUMENTS

DE 102015116300 A1 * 1/2017 ........... F16H 61/688

*Primary Examiner* — Roger L Pang
(74) *Attorney, Agent, or Firm* — Morgan, Lewis & Bockius LLP (57) ABSTRACT

A method of controlling a gear shifting in a neutral gear stage for shortening a gear shifting time in the neutral gear stage when performing a gear shifting of a hybrid electric vehicle is characterized in that when a shift class of the gear shifting is determined, a hybrid control unit of the vehicle determines a shift gear ratio in the N-stage in a current state by use of a transmission (TM) output speed and a transmission (TM) input speed at a class transition time point, determines an N-stage gear shifting progressing rate by use of the determined N-stage shift gear ratio, sets time points of a start and an end of the gear shifting based on the determined gear shifting progressing rate, and controls the gear shifting speed in the N-stage with reference to a gear shifting target speed and the transmission input speed in a section of the time points of the start and the end of the speed control.

5 Claims, 4 Drawing Sheets

(51) Int. Cl.
*F16H 59/42* (2006.01)
*F16H 59/40* (2006.01)
*F16H 59/14* (2006.01)
*F16H 61/02* (2006.01)
*F16H 61/16* (2006.01)
*B60W 10/08* (2006.01)
*B60W 10/10* (2012.01)
*F16H 59/70* (2006.01)

(52) U.S. Cl.
CPC ............. *F16H 59/14* (2013.01); *F16H 59/40* (2013.01); *F16H 59/42* (2013.01); *F16H 59/70* (2013.01); *F16H 61/0213* (2013.01); *F16H 61/16* (2013.01); *B60W 2510/083* (2013.01); *B60W 2510/101* (2013.01); *B60W 2510/104* (2013.01); *B60W 2510/1015* (2013.01); *B60W 2540/16* (2013.01); *B60W 2710/083* (2013.01); *B60W 2710/1005* (2013.01); *F16H 2059/147* (2013.01); *F16H 2059/708* (2013.01)

(58) Field of Classification Search
CPC ...... B60W 20/30; B60W 10/08; B60W 10/10; B60W 30/19; B60W 59/70; B60W 2510/101; B60W 2540/16; B60W 2510/104; B60W 2710/1005; B60W 2510/1015; B60W 30/18027; B60W 30/18036; B60W 30/18045
See application file for complete search history.

(56) References Cited

U.S. PATENT DOCUMENTS

2015/0329011 A1* 11/2015 Kawai ..................... B60L 50/51
701/22
2016/0084376 A1* 3/2016 Kim .................. F16H 61/0213
701/51

* cited by examiner

METHOD OF CONTROLLING GEAR SHIFT IN NEUTRAL GEAR STAGE IN HYBRID ELECTRIC VEHICLE

CROSS-REFERENCE TO RELATED APPLICATIONS

The present application claims priority to Korean Patent Application No. 10-2019-0115232, filed on Sep. 19, 2019, the entire contents of which is incorporated herein for all purposes by this reference.

BACKGROUND OF THE INVENTION

Field of the Invention

The present invention relates to a method of controlling a gear shifting in a neutral gear stage for shortening a gear shifting time in the neutral gear stage when performing a gear shifting of a hybrid electric vehicle, and more particularly, to a method of controlling a gear shifting in a neutral gear stage in a hybrid electric vehicle, characterized in that when a shift class of the gear shifting is determined, a hybrid control unit of the vehicle determines a shift gear ratio in the N-stage in a current state by use of a transmission (TM) output speed and a transmission (TM) input speed at a class transition time point, determines an N-stage gear shifting progressing rate by use of the determined N-stage shift gear ratio, sets time points of a start and an end portion of the gear shifting based on the determined gear shifting progressing rate, and controls the gear shifting speed in the N-stage with reference to a gear shifting target speed and the transmission input speed in a section of the time points of the start and the end portion of the speed control.

Description of Related Art

In general, a hybrid vehicle refers to a vehicle that operates by efficiently combining two or more different types of power sources. In a narrow term, the hybrid vehicle refers to a vehicle that obtains driving power from an engine using fuel such as gasoline or light oil and an electric motor operated by electric power from a battery. The hybrid vehicle is called a hybrid electric vehicle (HEV).

When the hybrid electric vehicle starts moving and travels in a low-speed section, the engine is stopped when the hybrid electric vehicle accelerates, and the vehicle operates by obtaining driving power only from the drive motor that operates by electric power from the high-voltage battery. This is because the efficiency of the engine is lower than the efficiency of the driving motor when the vehicle initially starts moving so that it is advantageous in terms of the fuel economy of the vehicle when the vehicle initially starts moving while using the drive motor with high efficiency.

On the other hand, under normal driving conditions, such as traveling at a constant speed, the hybrid electric vehicle is operated only by a rotational force from the engine. This is because the efficiency of the drive motor is lower than the efficiency of the engine when the vehicle travels at a constant speed and it is advantageous in terms of fuel economy of the vehicle when the vehicle travels while using the engine with high efficiency.

In addition, the hybrid electric vehicle also operates in a regenerative braking (RB) mode. In the regenerative braking mode, kinetic energy of the vehicle is converted into electrical energy by the drive motor and the battery is charged with the electrical energy when the vehicle is braked or decelerated. In the instant case, the battery is continuously controlled to maintain a constant level of charge, but in a state of charge below a certain level, an electric generator is operated by the rotational force of the engine to charge the battery.

Meanwhile, under a condition in which the vehicle rapidly accelerates, the drive motor may operate to supplement power to supply additional power higher than the power under a normal driving condition.

An HCU, the top-level controller of the hybrid electric vehicle, controls the engine, the motor, and the generator through cooperative control with a low-level controller and performs proper torque/speed control in accordance with the operation situations, appropriately distributing power for each operation mode.

Furthermore, the hybrid electric vehicle is mounted with a hybrid control unit (HCU) and provided with an engine control unit (ECU) for controlling the operation of the engine for respective device forming the system, a motor control unit (MCU) for controlling the operation of the drive motor, a transmission control unit (TCU) for controlling a transmission, a battery management system (BMS) for monitoring and managing a battery state, a full auto temperature controller (FATC) for controlling an indoor temperature, and the like.

In the instant case, the HCU is the top-level controller that is configured to control the operations of the other control units (ECU, MCU, TCU, BMS, and FATC), sets the hybrid operation mode, and controls the vehicle. The respective control units are connected through the high-speed CAN communication line around the HCU which is the top-level control unit such that the high-level control units transmit instructions to the low-level control units while transmitting and receiving information there between.

Meanwhile, all vehicles including hybrid electric vehicles perform a gear shifting in a neutral gear stage (N-stage).

The gear shifting in the neutral gear stage refers to a gear shifting to a Drive stage (D-stage) or an Rearward drive stage (R-stage) by a change in gear position from the neutral gear stage (N-stage) or refers to a gear shifting to the D-stage after control of the neutral gear stage by operation of an anti-lock brake system (ABS) of the vehicle without a change in gear position.

However, when describing the control method regarding the gear shifting in the N-stage in terms of the HCU and the TCU in the case of the hybrid electric vehicle in the related art, the HCU converges the transmission input stage torque into 0, and the TCU determines a gear shifting class in accordance with the change in gear position, opens one of the current hydraulic engagement pressures, and applies a hydraulic engagement pressure in a corresponding gear stage when the motor RPM approaches a target gear shifting speed.

However, in the case of the gear shifting control in the N-stage in the hybrid electric vehicle in the related art, because the transmission input stage torque becomes 0 to remove disturbance during the gear shifting in the N-stage and then the motor RPM converges into the target gear shifting speed by the control of the hydraulic gear shifting pressure of the TCU, there is a problem in that it is difficult to predict a change in motor RPM in accordance with changes in viscosity and hydraulic pressure of an automatic transmission fluid (ATF).

Furthermore, in the case of the gear shifting control in the N-stage in the hybrid electric vehicle in the related art, the TCU slowly raise a hydraulic engagement pressure to improve a gear shifting property when performing the gear shifting from the N-stage to the D-stage through the hydraulic gear shifting pressure control, but the present configuration delays the completion of the gear shifting, which causes a problem in that a driver feels an acceleration delay. If the TCU raises an increase rate of the hydraulic engagement pressure to prevent the delay of the completion of the gear shifting, the actual gear shifting time is shortened, but there occurs another problem in that a transmission shock is applied to the driver at the final time of the gear shifting.

Furthermore, to use N-stage speed control, a gear shifting progressing rate needs to be determined by a current gear ratio and a target gear ratio after the gear shifting. However, because there is no current gear ratio in the N-stage, the gear shifting progressing rate cannot be determined, which causes a problem in that no N-stage speed control is possible.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling a gear shifting in a neutral gear stage in a hybrid electric vehicle, the method being configured for shortening an actual gear shifting time when performing the gear shifting in the neutral gear stage by determining a gear shifting mode in the N-stage in the hybrid electric vehicle and determining a gear shifting progressing rate based on the determination.

The present invention, in various aspects, has also been made in an effort to provide a method of controlling a gear shifting in a neutral gear stage in a hybrid electric vehicle, the method slowly raising a hydraulic engagement pressure when performing the gear shifting from the N-stage to a D-stage, preventing an acceleration delay from being provided to a driver.

The present invention, in various aspects, has also been made in an effort to provide a method of controlling a gear shifting in a neutral gear stage in a hybrid electric vehicle, the method raising an increase rate of a hydraulic engagement pressure when performing the gear shifting from the N-stage to a D-stage, preventing transmission shock from being provided to a driver.

Various aspects of the present invention are directed to providing a method of controlling a gear shifting in a neutral gear stage in a hybrid electric vehicle, characterized in that when a shift class of the gear shifting is determined, a hybrid control unit of the vehicle determines a shift gear ratio in the N-stage in a current state by use of a transmission (TM) output speed and a transmission (TM) input speed at a class transition time point, determines an N-stage gear shifting progressing rate by use of the determined N-stage shift gear ratio, sets time points of a start and an end portion of the gear shifting based on the determined gear shifting progressing rate, and controls the gear shifting speed in the N-stage with reference to a gear shifting target speed and the transmission input speed in a section of the time points of the start and the end portion of the speed control.

The following effects are made by the method of controlling the gear shifting in the neutral gear stage in the hybrid electric vehicle according to an exemplary embodiment of the present invention having the aforementioned configuration.

First, the actual gear shifting time required for the gear shifting from the N-stage to the D-stage and the gear shifting from the N-stage to the R-stage is shortened by about 40%, and thus the fuel economy may be improved by about 1.5% in comparison with the method of controlling the gear shifting in the N-stage in the hybrid electric vehicle in the related art.

Second, in the case of the method of controlling the gear shifting in the N-stage in the hybrid electric vehicle in the related art, the actual gear shifting is performed only by controlling a hydraulic pressure by the TCU, and for the present reason, the time taken to reach the speed is long, and a shock occurs at the final time of the gear shifting due to an increase in hydraulic engagement pressure when a deviation between the target speed and the current speed is large. In contrast, according to an exemplary embodiment of the present invention, the control accuracy is ensured, such that the time taken to reach the target speed may be shortened, and the shock at the final time of the gear shifting may be reduced.

Third, in the case of the method of controlling the gear shifting in the N-stage in the hybrid electric vehicle in the related art, the hydraulic pressure is controlled by the TCU. In contrast, according to an exemplary embodiment of the present invention, the gear shifting in the N-stage is controlled by controlling the speed of the vehicle, such that a slip and a shock, which occurred due to the control of the hydraulic pressure when there is a deviation from the target speed, are prevented, as a result of which durability of a clutch and brake elements in a transmission is improved.

Fourth, because the gear shifting time from the N-stage to the D-stage is shortened by the control method according to an exemplary embodiment of the present invention, the lag of the vehicle and the response delay occurring during the actual gear shifting to the drive may be greatly reduced, such that marketability of the vehicle is improved.

Fifth, according to the control method according to an exemplary embodiment of the present invention, because the gear shifting to the D-stage after controlling the N-stage is rapidly performed when the driver operates the ABS, it is possible to maximize an effect of preventing an accident. Furthermore, an ABS N-stage control region may be expanded in the case of the high-friction braking that performs in-gear ABS control because of the delay of the response to the reacceleration after controlling the N-stage when the ABS operates, and as a result, there is an effect of significantly reducing the shock applied to the driver during rapid braking.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a configuration of a method of controlling a gear shifting in a neutral gear stage in a hybrid electric vehicle according to an exemplary embodiment of the present invention will be described with reference to the accompanying drawings.

However, the disclosed drawings are provided as an example for fully transferring the spirit of the present invention to those skilled in the art. Therefore, the present invention is not limited to the drawings disclosed below and may be specified as other aspects.

Furthermore, unless otherwise defined, the terminologies used in the specification of the present invention have the meanings that a person with ordinary skill in the technical field to which an exemplary embodiment of the present invention pertains typically understands, and in the following description and the accompanying drawings, a detailed description of publicly known functions and configurations will be omitted to avoid unnecessarily obscuring the subject matter of the present invention.

First, the terms used in the specification of the present invention will be described below to accurately understand the present invention.

In describing the control method according to an exemplary embodiment of the present invention, the term 'vehicle speed' means a value measured by a vehicle speed sensor mounted on a wheel of a vehicle, and the unit of the value of the vehicle speed is Kph.

Furthermore, in describing the control method according to an exemplary embodiment of the present invention, the term 'transmission (TM) output speed' means a value measured by a PG-B sensor (transmission output shaft speed sensor) installed in a transmission (TM), and the unit of the value of the TM output speed is rpm.

In the instant case, the correlation between the vehicle speed and the TM output speed is represented by the following Equation 1.

$$TM \text{ Output Speed (rpm)} = \text{Vehicle Speed} * \frac{10}{36} * \frac{60}{2\pi} * \frac{FGR}{\text{Dynamic Radius}} \quad \text{(Equation 1)}$$

FGR: Final Gear Ratio

Dynamic Radius: a distance from a center of a wheel to an internal diameter of a tire when a vehicle travels.

Furthermore, in describing the control method according to an exemplary embodiment of the present invention, the term 'transmission (TM) input speed' means a measured value of a motor speed by a motor control unit (MCU) in a hybrid electric vehicle of a transmission mounted electric device (TMED) type, and the unit of the value of the TM input speed is rpm.

The correlation between the TM output speed and the TM input speed is represented by the following Equation 2.

TM Input Speed=TM Output Speed*Current Gear Ratio (Equation 2)

Furthermore, in describing the control method according to an exemplary embodiment of the present invention, the terms related to the determination of the Neutral gear stage (N-stage) gear shifting progressing rate will be described below.

First, a gear shifting target speed is determined based on the following Equation 3.

Gear shifting Target Speed=TM Output Speed*Gear Ratio in Target Gear Stage (Equation 3)

Furthermore, when the shift gear ratio of the Neutral gear stage (N-stage) is consistently determined at all time points in the N-stage, the shift gear ratio continuously varies, which causes the misdetermination of the gear shifting progressing rate. Therefore, the N-stage shift gear ratio is determined only at a transition time point at which there occurs a shift class of a gear shifting from the N-stage to a D-stage or a gear shifting from the N-stage to an R-stage. Accordingly, the N-stage shift gear ratio is determined by the TM input speed and the TM output speed through the following Equation 4.

N-Stage Shift Gear Ratio=((Transmission Input Speed at Transition Time Point of Shift Class of Gear shifting from N-Stage To D-Stage or Gear shifting from N-Stage to R-Stage)/(Transmission Output Speed at Transition Time Point of Shift Class of Gear shifting from N-Stage To D-Stage or Gear shifting from N-Stage to R-Stage)) (Equation 4)

Furthermore, the Neutral gear stage (N-stage) gear shifting progressing rate is determined based on the following Equation 5.

N-Stage Gear shifting Progressing Rate=((Transmission Input Speed−Transmission Output Speed*N-Stage Gear Ratio)/(Transmission Output Speed*Target Gear Ratio−(Transmission Output Speed*N-Stage Gear Ratio))) (Equation 5)

Target Gear Ratio: a gear ratio in a target gear stage designated by a transmission control unit (TCU)

Therefore, by use of the above-mentioned Equations, the gear shifting target speed is determined (by Equation 3) and the N-stage gear shifting progressing rate is determined (by Equation 5). Time points of the start and the end of the speed control during the N-stage gear shifting are set based on the determined gear shifting target speed and the determined N-stage gear shifting progressing rate, and the feedback motor torque control is performed based on a deviation between a gear shifting target speed and a current gear shifting speed.

In the instant case, because the performance of the speed control may deteriorate in accordance with viscosity of an automatic transmission fluid (ATF), gains of the feedback motor torque may be differentiated in accordance with a temperature of the automatic transmission fluid.

Figure 1:
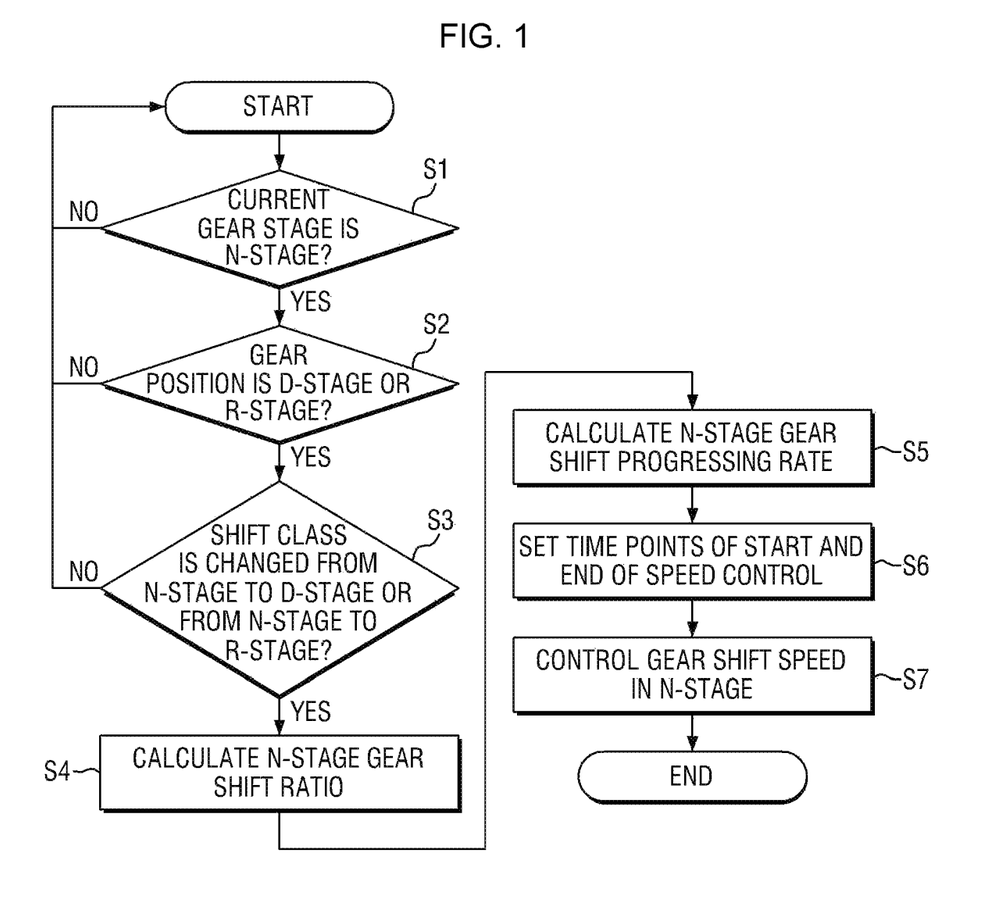
FIG. 1 is a flowchart of a method of controlling a gear shifting in a neutral gear stage according to an exemplary embodiment of the present invention.

FIG. 1 is a flowchart of the method of controlling the gear shifting in the neutral gear stage in the hybrid electric vehicle according to an exemplary embodiment of the present invention. Hereinafter, configurations of respective steps according to an exemplary embodiment of the present invention will be described in detail in a summarized manner.

Current Gear State Determination Step (S1)

This step is a step of determining, by the hybrid control unit (HCU) of the vehicle, whether the current gear stage is the N-stage to determine the gear shifting progressing rate in the Neutral gear stage (N-stage).

2) Gear Position Determination Step (S2)

This step is a step of determining, by the hybrid control unit of the vehicle, whether the gear position is in the D-stage or the Rearward drive stage (R-stage) to determine whether the gear shifting is performed from the N-stage to the Drive stage (D-stage) or the gear shifting is performed from the N-stage to the Rearward drive stage (R-stage) when it is determined in the current gear state determination step S1 that the current gear stage is the N-stage.

3) Shift Class Determination Step (S3)

This step is a step of determining, by the hybrid control unit, whether the shift class of the gear shifting is the shift class from the N-stage to the D-stage or the shift class from the N-stage to the R-stage when it is determined in the gear position determination step S2 that the gear position is in the D-stage or the R-stage.

4) N-Stage Shift Gear Ratio Determination Step (S4)

Figure 2:
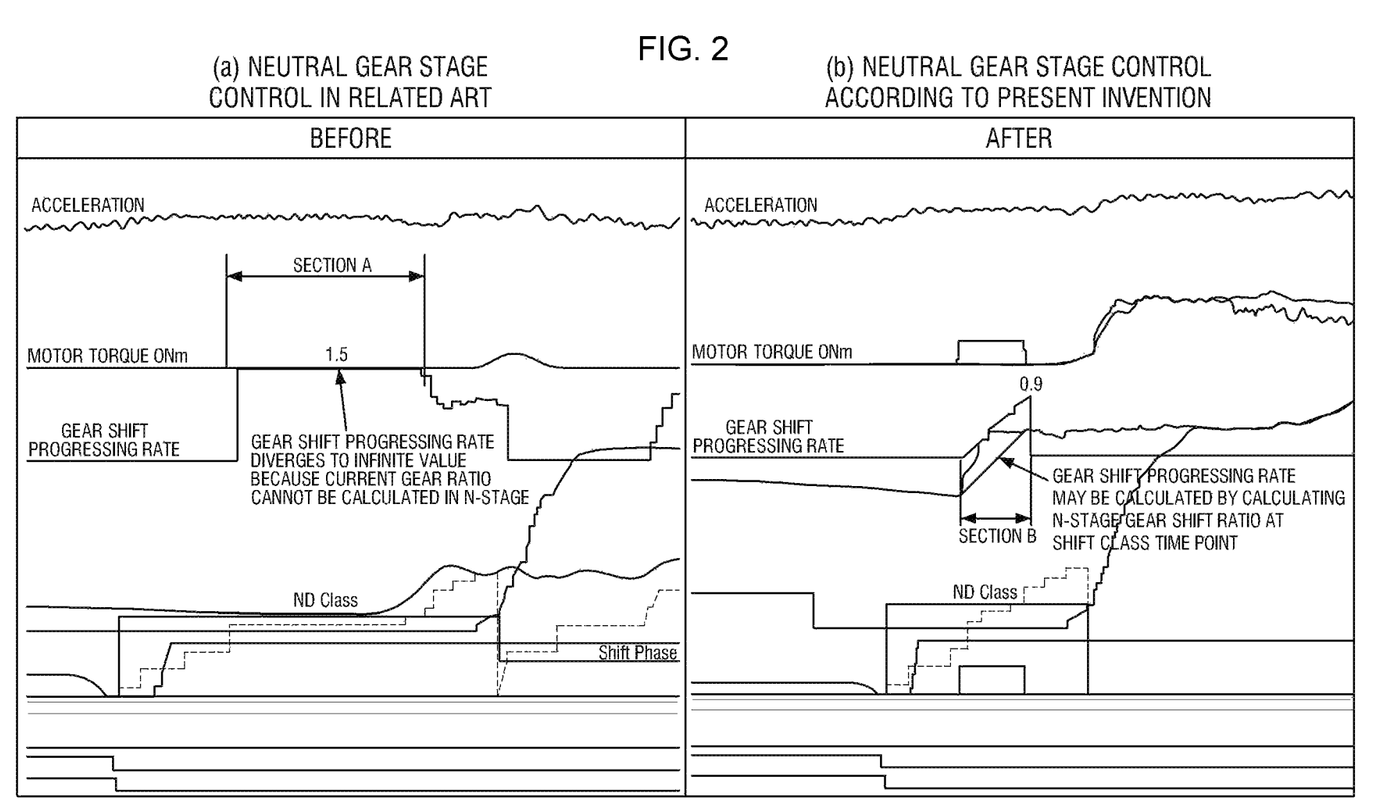
FIG. 2 is a timing chart of an initial step of an N-stage gear shifting progressing rate by the method of controlling the gear shifting in the neutral gear stage according to an exemplary embodiment of the present invention.

FIG. 2 is a timing chart of an initial step of the N-stage gear shifting progressing rate by the method of controlling the gear shifting in the neutral gear stage according to an exemplary embodiment of the present invention.

Referring to the timing chart in the related art at the left in FIG. 2, in the case of the hybrid electric vehicle in the related art illustrated at the left portion (a), the hybrid control unit (HCU) converges the transmission input stage torque into 0 in the N-stage to determine the shift gear ratio as 0. As a result, because the N-stage gear shifting progressing rate diverges as an infinite value as shown by section A in the timing chart in the related art at the left in FIG. 2, the HCU cannot perform the speed control.

Therefore, the transmission control unit (TCU) performs an actual gear shifting from the N-stage to the D-stage only by controlling a hydraulic gear shifting pressure. However, as described above, if the transmission control unit (TCU) raises the hydraulic pressure to prevent gear shifting shock, the completion of the gear shifting is delayed, which provides the delay of acceleration to a driver.

The gear shifting from the N-stage to the D-stage after the N-stage control when an ABS operates is controlled from the N-stage to the D-stage in a state in which the gear position still remains in the D-stage. Therefore, if the acceleration is performed at the present moment, there is a problem in that torque cannot be transmitted for a significantly long time period.

Therefore, when the steps S1 to S3 are performed and it is determined that the shift class of the gear shifting is the shift class from the N-stage to the D-stage or the shift class from the N-stage to the R-stage, the hybrid control unit determines the shift gear ratio in the N-stage in the current state by use of the TM output speed and the TM input speed at the class transition time point.

The shift gear ratio in the N-stage is determined based on the following Equation 4 described above.

$N$-Stage Shift Gear Ratio=((Transmission Input Speed at Transition Time Point of Shift Class of Gear Shifting from $N$-Stage To $D$-Stage or Gear Shifting from $N$-Stage to $R$-Stage)/(Transmission Output Speed at Transition Time Point of Shift Class of Gear Shifting from $N$-Stage To $D$-Stage or Gear Shifting from $N$-Stage to $R$-Stage)) (Equation 4)

In the instant case, the hybrid control unit fixes the determined N-stage shift gear ratio value to the current gear ratio value until the current gear is changed. If the N-stage shift gear ratio value is not fixed to the current gear ratio value and the N-stage shift gear ratio value is consistently determined over time, it is impossible to determine the accurate gear shifting progressing rate.

As described above, when the shift gear ratio is determined at the class transition time point and then the N-stage gear shifting progressing rate to be described below is determined, it may be seen that the gear shifting progressing rate gradually varies as shown in section B in the timing chart according to an exemplary embodiment of the present invention at the right portion (b) in FIG. 2, without diverging the gear shifting progressing rate in the related art to the infinite value.

5) N-Stage Gear Shifting Progressing Rate Determination Step (S5)

The N-stage gear shifting progressing rate is determined by use of the above-determined N-stage current shift gear ratio.

The N-stage gear shifting progressing rate is determined based on the following Equation 5 described above.

$N$-Stage Gear Shifting Progressing Rate=((Transmission Input Speed−Transmission Output Speed*$N$-Stage Gear Ratio)/((Transmission Output Speed*Target Gear Ratio−(Transmission Output Speed*$N$-Stage Gear Ratio))) (Equation 5)

The TM output speed and the TM input speed are measured based on sensor values, and the target gear ratio is a gear ratio value of a target gear which is designated by the TCU.

Therefore, as described above, when the N-stage gear shifting progressing rate is determined, the gear shifting progressing rate may be construed as a physical result value of the hydraulic gear shifting pressure of the TCU in the sections at the time point of the start and the end of the speed control of the hybrid control unit (HCU). For example, if the gear shifting progressing rate begins to be raised from 0% in the N-stage without changing external torque, the time point may be considered as the time point at which the hydraulic engagement pressure goes beyond the hydraulic base pressure and begins to affect vehicle inertia.

However, as described above, if the hybrid control unit (HCU) applies the speed control torque after the time point of the start of the actual gear shifting and applies the speed control torque at the time point at which the gear shifting progressing rate reaches 100%, the gear shifting shock may occur in the vehicle at the final time of the gear shifting. Therefore, the speed control may be ended therebefore.

6) Step of Setting Time Points of Start and End of Speed Control (S6)

When the gear shifting progressing rate is determined in the N-stage gear shifting progressing rate determination step (S5), the hybrid control unit sets the time points of the start and the end of the gear shifting as values between 10% and 90% based on the determined gear shifting progressing rate to prevent the shock at the initial time and the final time.

7) Step of Controlling Gear Shifting Speed in N-Stage (S7)

This step is a step of controlling the gear shifting speed in the N-stage with reference to the gear shifting target speed and the TM input speed. The hybrid control unit sets a speed control gain value by a deviation between the gear shifting target speed and the current gear shifting speed according to the TM input speed and performs feedback motor torque control.

The gear shifting target speed is determined based on (TM Output Speed*Target Gear Ratio) of Equation 3 described above.

Figure 3:
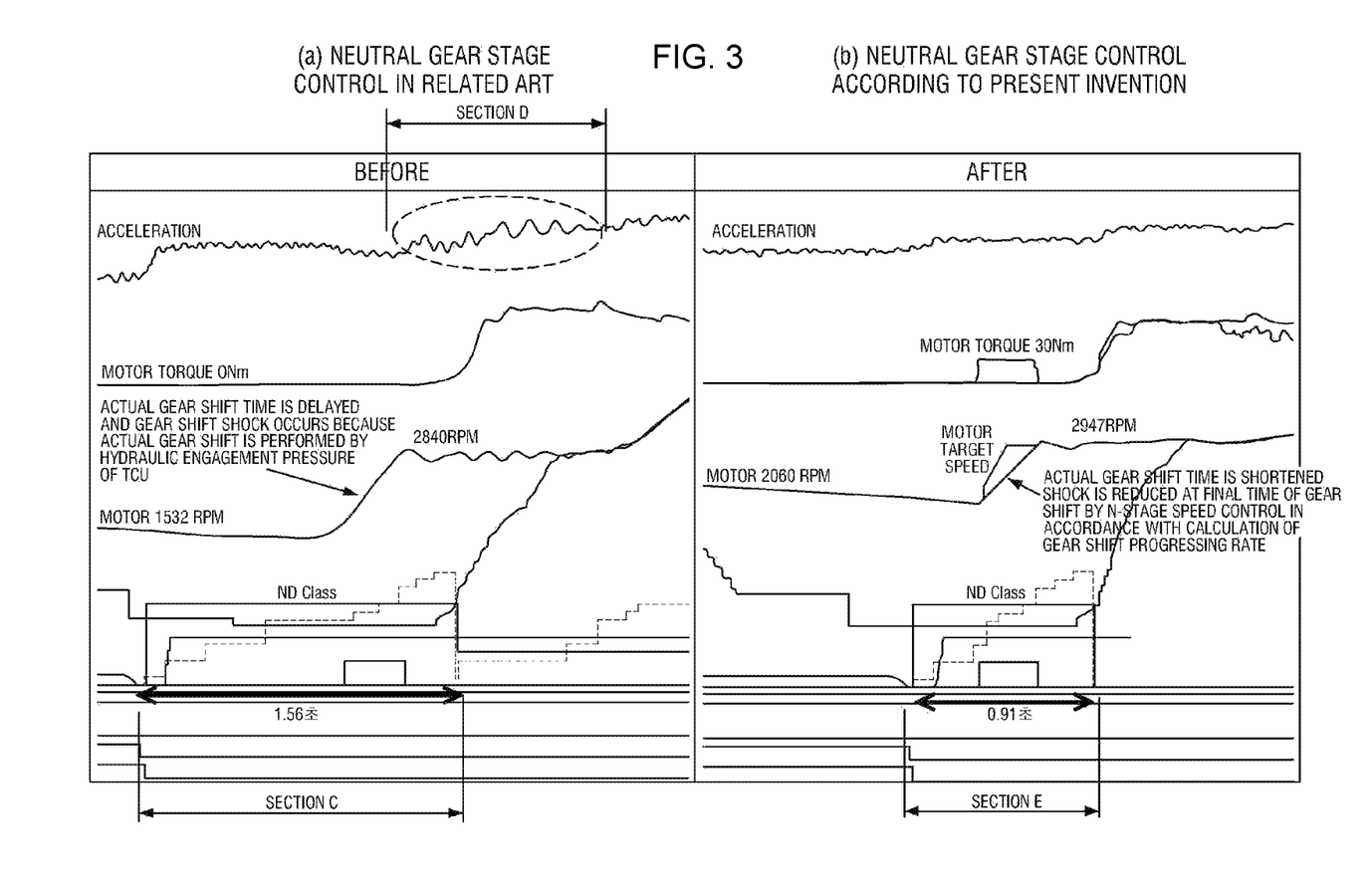
FIG. 3 is a timing chart of a final step of the N-stage gear shifting progressing rate by the method of controlling the gear shifting in the neutral gear stage according to an exemplary embodiment of the present invention.

FIG. 3 is a timing chart of a final step of the N-stage gear shifting progressing rate by the method of controlling the gear shifting in the neutral gear stage according to an exemplary embodiment of the present invention.

Referring to the timing chart in the related art shown in part (a) at the left in FIG. 3, because the transmission control unit (TCU) performs the actual gear shifting only by controlling the hydraulic engagement pressure in the related art as described above, the actual gear shifting time (section C: 1.56 seconds) is delayed, and there is a section in which the gear shifting shock occurs at the final time like section D.

However, referring to the timing chart according to an exemplary embodiment of the present invention shown in part (b) at the right in FIG. 3, it may be seen that the N-stage speed control is performed in accordance with the determination of the gear shifting progressing rate, such that the actual gear shifting time (section E: 0.91 second) is shortened, and the section in which the gear shifting shock occurs at the final time of the gear shifting, like section D in the related art, is removed.

Figure 4:
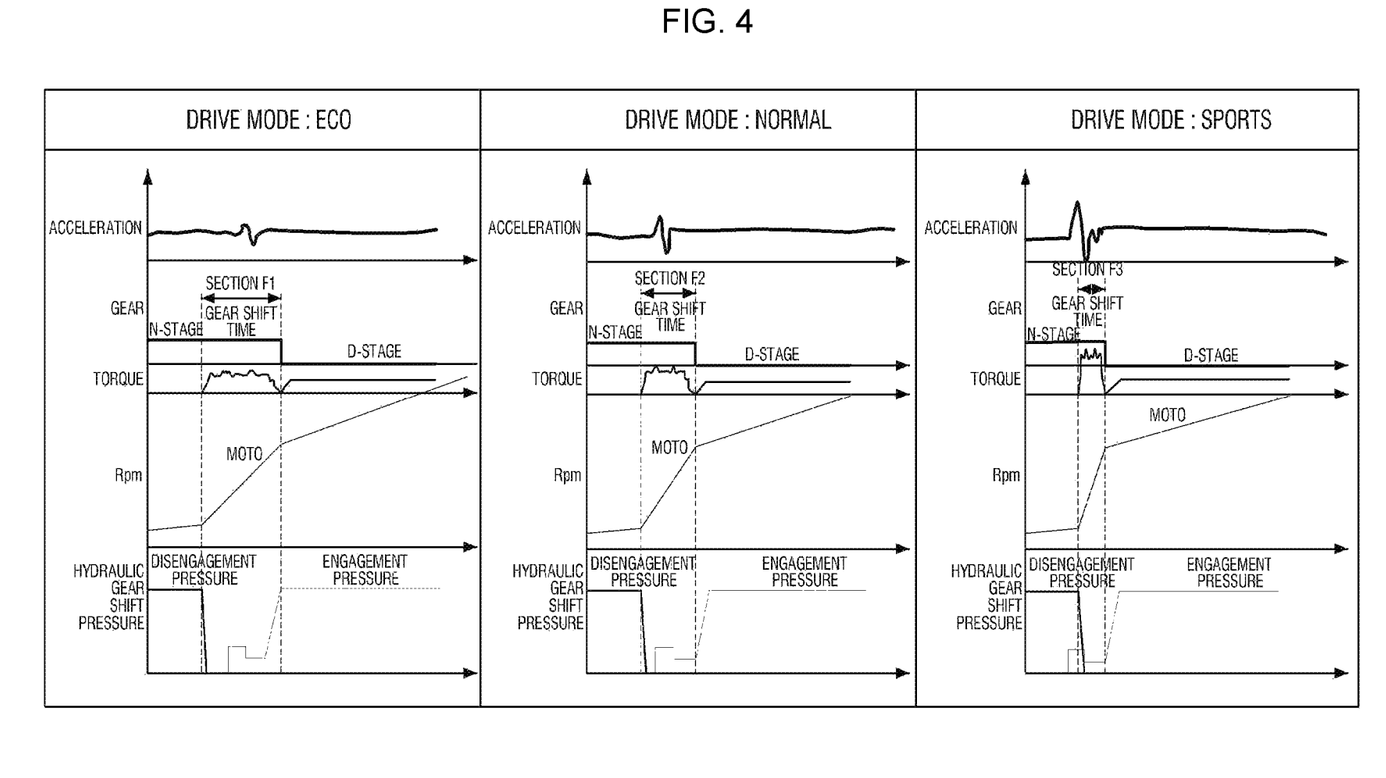
FIG. 4 is a timing chart of the N-stage gear shifting progressing rate in accordance with an operation mode of a vehicle by the method of controlling the gear shifting in the neutral gear stage according to an exemplary embodiment of the present invention.

Next, as an exemplary embodiment of the present invention, FIG. 4 is a timing chart of the N-stage gear shifting progressing rate in accordance with an operation mode of the vehicle by the method of controlling the gear shifting in the neutral gear stage according to an exemplary embodiment of the present invention. A method of adjusting a gear shifting property in accordance with the determination of the gear shifting progressing rate will be described with reference to FIG. 4.

First, referring to the timing chart of FIG. 4, it may be seen that when the operation mode of the vehicle is a normal mode, the gear shifting time (section F2) is shorter than the gear shifting time (section F1) in the case of an economical mode (fuel economy operation mode for saving fuel), and the gear shifting time (section F3) in a sports mode is shorter than the gear shifting time (section F2) in the normal mode.

Therefore, as illustrated in FIG. 4, the gear shifting time may be adjusted in accordance with the operation mode of the vehicle based on the determination of the N-stage gear shifting progressing rate according to an exemplary embodiment of the present invention. The gear shifting property in the N-stage may be adjusted such that the shock is somewhat increased but the acceleration delay is decreased in the sports mode, and the shock is decreased but the acceleration is increased in the normal mode.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a gear shifting in a neutral gear stage in a hybrid electric vehicle, the method comprising:
   determining, by a controller of the vehicle, when a current gear stage is a neutral gear stage (N-stage);
   determining, by the controller, when a gear position is in a drive stage (D-stage) or a rearward drive stage (R-stage) in a response that the current gear state is determined to be the N-stage;
   determining, by the controller, when a shift class of the gear shifting is a shift class from the N-stage to the D-stage or a shift class from the N-stage to the R-stage in a response that the gear position is determined to be in the D-stage or the R-stage;
   determining, by the controller, a shift gear ratio in the N-stage in a current state of the vehicle by use of a transmission (TM) output speed and a TM input speed at a class transition time point in a response that the shift class of the gear shifting is determined to be the shift class from the N-stage to the D-stage or the shift class from the N-stage to the R-stage;
   determining an N-stage gear shifting progressing rate by use of the determined shift gear ratio in the N-stage;
   setting, by the controller, time points of a start and an end of speed control for setting the time points of the start and the end of the gear shifting based on the determined gear shifting progressing rate; and
   controlling, by the controller, a speed of the gear shifting in the N-stage with reference to a gear shifting target speed and the TM input speed in a section of the time points of the start and the end of the speed control.

2. The method of claim 1, wherein in the determining, by the controller, the shift gear ratio in the N-stage, the N-stage shift gear ratio is determined based on the following Equation 4

*N*-Stage Shifting Gear Ratio=((Transmission Input Speed at Transition Time Point of Shifting Class of Gear Shifting from *N*-Stage To *D*-Stage or Gear Shifting from *N*-Stage to *R*-Stage)/(Transmission Output Speed at Transition Time Point of Shifting Class of Gear Shifting from *N*-Stage To *D*-Stage or Gear Shifting from *N*-Stage to *R*-Stage))     (Equation 4).

3. The method of claim 1, wherein in the determining the N-stage gear shifting progressing rate, the N-stage gear shifting progressing rate is determined based on the following Equation 5

$$N\text{-Stage Gear Shifting Progressing Rate} = (\text{Transmission Input Speed} - \text{Transmission Output Speed} * N\text{-Stage Gear Ratio}) / (\text{Transmission Output Speed} * \text{Target Gear Ratio} - (\text{Transmission Output Speed} * N\text{-Stage Gear Ratio})) \quad \text{(Equation 5)}.$$

4. The method of claim 1, wherein in the setting the time points of the start and the end of the speed control, the controller is configured to set the time points of the start and the end of the gear shifting as values between 10% and 90% based on the determined gear shifting progressing rate.

5. The method of claim 1, wherein in the controlling the gear shifting speed in the N-stage, the controller is configured to set a speed control gain value by a deviation between the gear shifting target speed and a current gear shifting speed in accordance with the TM input speed and to perform feedback motor torque of a motor in the vehicle.

* * * * *